United States Patent
Heral

(10) Patent No.: US 10,941,955 B2
(45) Date of Patent: Mar. 9, 2021

(54) SYSTEMS, METHODS, AND APPARATUSES FOR PROVIDING COMMUNICATIONS BETWEEN CLIMATE CONTROL DEVICES IN A RECREATIONAL VEHICLE

(71) Applicant: Dometic Sweden AB, Solna (SE)

(72) Inventor: Tanner Heral, Fort Wayne, IN (US)

(73) Assignee: Dometic Sweden AB, Solna (SE)

( * ) Notice: Subject to any disclaimer, the term of this patent is extended or adjusted under 35 U.S.C. 154(b) by 8 days.

(21) Appl. No.: 16/172,253

(22) Filed: Oct. 26, 2018

(65) Prior Publication Data

US 2019/0128551 A1 May 2, 2019

Related U.S. Application Data

(60) Provisional application No. 62/578,350, filed on Oct. 27, 2017.

(51) Int. Cl.
*F24F 11/58* (2018.01)
*H04L 29/08* (2006.01)
(Continued)

(52) U.S. Cl.
CPC ............ *F24F 11/58* (2018.01); *B60H 1/0065* (2013.01); *B60H 1/00364* (2013.01);
(Continued)

(58) Field of Classification Search
CPC .............. B60H 1/00364; B60H 1/0065; B60H 1/00792; B60H 1/00821; B60H 1/00964;
(Continued)

(56) References Cited

U.S. PATENT DOCUMENTS 4,916,909 A   4/1990 Mathur et al.
5,424,720 A   6/1995 Kirkpatrick
(Continued)

FOREIGN PATENT DOCUMENTS

AU   2001280374 A1   5/2002
AU   2002335708 B2   4/2008
(Continued)

OTHER PUBLICATIONS

"Understanding : On/Off, Floating, Modulating/Proportional Control", retreived from internet URL: https://controltrends.org/by-industry/commercial-hvac/03/understanding-on-off-floating-modulatingproportional-control/,on Jan. 23, 2019, pp. 2, paragraph 3.
(Continued)

*Primary Examiner* — Chun Cao
(74) *Attorney, Agent, or Firm* — Middleton Reutlinger

(57) ABSTRACT

Methods, apparatus, systems, and computer-readable media are provided for enabling one or more climate control devices to communicate with a central control device of a recreational vehicle. Specifically, a gateway device is set forth for processing network signals from the control device and converting the network signals into command signals that can be transmitted to various climate control devices associated with the gateway device. For example, the control device can communicate with existing climate control devices according to a particular communication protocol that is not recognized by certain climate control devices. In order to allow the control device to communicate with those certain climate control devices, the gateway device can operate to translate the network signal into command signals that are recognizable, or otherwise able to be processed by, the certain climate control devices.

20 Claims, 5 Drawing Sheets

(51) Int. Cl.
  *H04L 29/06*    (2006.01)
  *F24F 11/88*    (2018.01)
  *F24F 11/89*    (2018.01)
  *F24F 11/30*    (2018.01)
  *B60H 1/00*     (2006.01)

(52) U.S. Cl.
  CPC ..... *B60H 1/00792* (2013.01); *B60H 1/00821* (2013.01); *F24F 11/30* (2018.01); *F24F 11/88* (2018.01); *F24F 11/89* (2018.01); *H04L 67/12* (2013.01); *H04L 67/2823* (2013.01); *H04L 69/08* (2013.01)

(58) Field of Classification Search
  CPC .. F24F 11/30; F24F 11/58; F24F 11/88; F24F 11/89; H04L 67/12; H04L 67/2823; H04L 69/08
  USPC .......................................................... 700/276
  See application file for complete search history.

(56) References Cited

U.S. PATENT DOCUMENTS

| | | | |
|---|---|---|---|
| 5,632,614 A | 5/1997 | Consadori et al. | |
| 6,134,906 A | 10/2000 | Eastman | |
| 6,460,356 B1 | 10/2002 | Tao et al. | |
| 6,729,144 B1 | 5/2004 | Kupferman | |
| 6,856,820 B1 | 2/2005 | Kolls | |
| 6,863,222 B2 | 3/2005 | Slifkin et al. | |
| 6,929,061 B2 | 8/2005 | Lajeunesse | |
| 7,082,380 B2 | 7/2006 | Wiebe et al. | |
| 7,117,051 B2 | 10/2006 | Landry et al. | |
| 7,131,282 B2 | 11/2006 | Karlsson et al. | |
| 7,412,837 B2 | 8/2008 | Karisson et al. | |
| 7,448,546 B2 | 11/2008 | Jung et al. | |
| D604,305 S | 11/2009 | Anzures et al. | |
| 7,707,845 B2 * | 5/2010 | Bilodeau ............ B60H 1/00378 165/42 | |
| 8,307,667 B2 | 11/2012 | Rusignuolo et al. | |
| 8,374,824 B2 | 2/2013 | Schwiers et al. | |
| 8,461,958 B2 | 6/2013 | Saenz et al. | |
| 8,539,783 B1 | 9/2013 | Bunch | |
| 8,545,113 B2 | 10/2013 | Johnson et al. | |
| 8,549,131 B2 | 10/2013 | Keyghobad et al. | |
| 8,653,949 B2 | 2/2014 | Lee et al. | |
| 8,960,563 B1 | 2/2015 | Porten et al. | |
| 8,981,930 B2 | 3/2015 | Horstemeyer et al. | |
| 9,193,312 B2 * | 11/2015 | Colella ................. B60R 16/023 | |
| 9,454,897 B2 | 9/2016 | Cattermole et al. | |
| 2003/0164754 A1 | 9/2003 | Roseen | |
| 2005/0141154 A1 | 6/2005 | Consadori et al. | |
| 2007/0023180 A1* | 2/2007 | Komarek ............ B60H 1/00028 165/202 | |
| 2007/0028635 A1* | 2/2007 | Gleeson ............. B60H 1/00585 62/239 | |
| 2008/0087663 A1 | 4/2008 | Mansbery et al. | |
| 2008/0115513 A1 | 5/2008 | Unmack | |
| 2008/0121729 A1* | 5/2008 | Gray .................. G05D 23/1934 236/51 | |
| 2008/0299961 A1 | 12/2008 | Muller et al. | |
| 2009/0139246 A1 | 6/2009 | Lifson et al. | |
| 2010/0274604 A1 | 10/2010 | Crilly | |
| 2012/0255317 A1 | 10/2012 | Leistner et al. | |
| 2014/0210593 A1 | 7/2014 | Cattermole et al. | |
| 2014/0313055 A1 | 10/2014 | Warkentin et al. | |
| 2015/0198937 A1 | 7/2015 | Wait | |
| 2016/0211985 A1 | 7/2016 | Castillo et al. | |
| 2016/0214621 A1* | 7/2016 | Baalu ...................... H04W 4/70 | |
| 2018/0147913 A1* | 5/2018 | Bergin ............... B60H 1/00364 | |

FOREIGN PATENT DOCUMENTS

| | | |
|---|---|---|
| AU | 2006259965 B2 | 6/2009 |
| CN | 2420532 Y | 2/2001 |
| CN | 1299034 A | 6/2001 |
| CN | 2434623 Y | 6/2001 |
| CN | 2524157 Y | 12/2002 |
| CN | 1116579 C | 7/2003 |
| CN | 1475763 A | 2/2004 |
| CN | 1178037 C | 12/2004 |
| CN | 1570929 A | 1/2005 |
| CN | 1761318 A | 4/2006 |
| CN | 1763450 A | 4/2006 |
| CN | 2769742 Y | 4/2006 |
| CN | 2780132 Y | 5/2006 |
| CN | 2811877 Y | 8/2006 |
| CN | 1828186 A | 9/2006 |
| CN | 2829654 Y | 10/2006 |
| CN | 2849539 Y | 12/2006 |
| CN | 1888750 A | 1/2007 |
| CN | 1936533 A | 3/2007 |
| CN | 2878997 Y | 3/2007 |
| CN | 2906406 Y | 5/2007 |
| CN | 101063586 A | 10/2007 |
| CN | 200961918 Y | 10/2007 |
| CN | 101074816 A | 11/2007 |
| CN | 201000370 Y | 1/2008 |
| CN | 201015999 Y | 2/2008 |
| CN | 201028884 Y | 2/2008 |
| CN | 100373116 C | 3/2008 |
| CN | 100380075 C | 4/2008 |
| CN | 101153758 A | 4/2008 |
| CN | 201066217 Y | 5/2008 |
| CN | 100397004 C | 6/2008 |
| CN | 100398956 C | 7/2008 |
| CN | 101245936 A | 8/2008 |
| CN | 101245957 A | 8/2008 |
| CN | 100417880 C | 9/2008 |
| CN | 101266069 A | 9/2008 |
| CN | 201129824 Y | 10/2008 |
| CN | 201129825 Y | 10/2008 |
| CN | 201149349 Y | 11/2008 |
| CN | 201163244 Y | 12/2008 |
| CN | 201166753 Y | 12/2008 |
| CN | 201170678 Y | 12/2008 |
| CN | 101368771 A | 2/2009 |
| CN | 201191043 Y | 2/2009 |
| CN | 201196458 Y | 2/2009 |
| CN | 201209986 Y | 3/2009 |
| CN | 201230319 Y | 4/2009 |
| CN | 101435604 A | 5/2009 |
| CN | 201233076 Y | 5/2009 |
| CN | 201237396 Y | 5/2009 |
| CN | 101476563 A | 7/2009 |
| CN | 101498933 A | 8/2009 |
| CN | 201297694 Y | 8/2009 |
| CN | 201306900 Y | 9/2009 |
| CN | 201348340 Y | 11/2009 |
| CN | 201348413 Y | 11/2009 |
| CN | 100575078 C | 12/2009 |
| CN | 201363279 Y | 12/2009 |
| CN | 201363838 Y | 12/2009 |
| CN | 201363859 Y | 12/2009 |
| CN | 201363949 Y | 12/2009 |
| CN | 101665037 A | 3/2010 |
| CN | 101691863 A | 4/2010 |
| CN | 201486856 U | 5/2010 |
| CN | 201503133 U | 6/2010 |
| CN | 201539404 U | 8/2010 |
| CN | 201541754 U | 8/2010 |
| CN | 201546958 U | 8/2010 |
| CN | 201575541 U | 9/2010 |
| CN | 201589475 U | 9/2010 |
| CN | 1928445 B | 10/2010 |
| CN | 101251290 B | 10/2010 |
| CN | 101866173 A | 10/2010 |
| CN | 101363640 B | 11/2010 |
| CN | 201621800 U | 11/2010 |
| CN | 201622078 U | 11/2010 |
| CN | 201666251 U | 12/2010 |
| CN | 201672642 U | 12/2010 |
| CN | 201748559 U | 2/2011 |
| CN | 201749468 U | 2/2011 |

(56) References Cited

FOREIGN PATENT DOCUMENTS

| | | | |
|---|---|---|---|
| CN | 101435616 B | 4/2011 |
| CN | 101464032 B | 4/2011 |
| CN | 102012146 A | 4/2011 |
| CN | 201820291 U | 5/2011 |
| CN | 101619882 B | 6/2011 |
| CN | 201849367 U | 6/2011 |
| CN | 201852224 U | 6/2011 |
| CN | 102118435 A | 7/2011 |
| CN | 201908838 U | 7/2011 |
| CN | 101586562 B | 8/2011 |
| CN | 102147125 A | 8/2011 |
| CN | 102151092 A | 8/2011 |
| CN | 102156466 A | 8/2011 |
| CN | 201923534 U | 8/2011 |
| CN | 201948819 U | 8/2011 |
| CN | 101435617 B | 9/2011 |
| CN | 102192569 A | 9/2011 |
| CN | 201964703 U | 9/2011 |
| CN | 201976127 U | 9/2011 |
| CN | 201982375 U | 9/2011 |
| CN | 102213518 A | 10/2011 |
| CN | 102235717 A | 11/2011 |
| CN | 102252369 A | 11/2011 |
| CN | 202050251 U | 11/2011 |
| CN | 202083072 U | 12/2011 |
| CN | 102338428 A | 2/2012 |
| CN | 102345951 A | 2/2012 |
| CN | 102355628 A | 2/2012 |
| CN | 102364319 A | 2/2012 |
| CN | 202177186 U | 3/2012 |
| CN | 101556069 B | 4/2012 |
| CN | 202186048 U | 4/2012 |
| CN | 101443719 B | 5/2012 |
| CN | 102444957 A | 5/2012 |
| CN | 102466296 A | 5/2012 |
| CN | 102478335 A | 5/2012 |
| CN | 101275800 B | 6/2012 |
| CN | 101788172 B | 7/2012 |
| CN | 101825087 B | 7/2012 |
| CN | 101846381 B | 7/2012 |
| CN | 101886852 B | 7/2012 |
| CN | 102042724 B | 7/2012 |
| CN | 102536819 A | 7/2012 |
| CN | 102564052 A | 7/2012 |
| CN | 102588285 A | 7/2012 |
| CN | 202287095 U | 7/2012 |
| CN | 202305190 U | 7/2012 |
| CN | 102032643 B | 8/2012 |
| CN | 102620517 A | 8/2012 |
| CN | 102650479 A | 8/2012 |
| CN | 101988839 B | 9/2012 |
| CN | 102679490 A | 9/2012 |
| CN | 102691660 A | 9/2012 |
| CN | 202431521 U | 9/2012 |
| CN | 202431522 U | 9/2012 |
| CN | 202442411 U | 9/2012 |
| CN | 202452784 U | 9/2012 |
| CN | 102705237 A | 10/2012 |
| CN | 202470336 U | 10/2012 |
| CN | 202475495 U | 10/2012 |
| CN | 202476017 U | 10/2012 |
| CN | 202501706 U | 10/2012 |
| CN | 202503538 U | 10/2012 |
| CN | 202511560 U | 10/2012 |
| CN | 101988717 B | 11/2012 |
| CN | 102765563 B | 11/2012 |
| CN | 202532335 U | 11/2012 |
| CN | 202563323 U | 11/2012 |
| CN | 102809202 B | 12/2012 |
| CN | 102840716 A | 12/2012 |
| CN | 202568984 U | 12/2012 |
| CN | 202581676 U | 12/2012 |
| CN | 202598971 U | 12/2012 |
| CN | 202613597 U | 12/2012 |
| CN | 202613835 U | 12/2012 |
| CN | 202630282 U | 12/2012 |
| CN | 102853624 A | 1/2013 |
| CN | 102878663 A | 1/2013 |
| CN | 102889748 A | 1/2013 |
| CN | 202648236 U | 1/2013 |
| CN | 202692596 U | 1/2013 |
| CN | 202708102 U | 1/2013 |
| CN | 202709553 U | 1/2013 |
| CN | 102914102 A | 2/2013 |
| CN | 202734071 U | 2/2013 |
| CN | 202734420 U | 2/2013 |
| CN | 202789544 U | 3/2013 |
| CN | 202835631 U | 3/2013 |
| CN | 102116515 B | 4/2013 |
| CN | 103032933 A | 4/2013 |
| CN | 202851355 U | 4/2013 |
| CN | 202868893 U | 4/2013 |
| CN | 202868894 U | 4/2013 |
| CN | 202868919 U | 4/2013 |
| CN | 202868920 U | 4/2013 |
| CN | 103105204 A | 5/2013 |
| CN | 202916629 U | 5/2013 |
| CN | 203771639 U | 5/2013 |
| CN | 103162469 A | 6/2013 |
| CN | 103177339 A | 6/2013 |
| CN | 202967270 U | 6/2013 |
| CN | 202993659 U | 6/2013 |
| CN | 202993694 U | 6/2013 |
| CN | 103188655 A | 7/2013 |
| CN | 103196274 A | 7/2013 |
| CN | 203053481 U | 7/2013 |
| CN | 203068889 U | 7/2013 |
| CN | 103245007 A | 8/2013 |
| CN | 103245031 A | 8/2013 |
| CN | 103245033 A | 8/2013 |
| CN | 203116393 U | 8/2013 |
| CN | 203163367 U | 8/2013 |
| CN | 203164715 U | 8/2013 |
| CN | 103292572 A | 9/2013 |
| CN | 103322766 A | 9/2013 |
| CN | 203203288 U | 9/2013 |
| CN | 203203289 U | 9/2013 |
| CN | 203203317 U | 9/2013 |
| CN | 103335485 A | 10/2013 |
| CN | 103375870 A | 10/2013 |
| CN | 103375871 A | 10/2013 |
| CN | 103375935 A | 10/2013 |
| CN | 203310199 U | 11/2013 |
| CN | 103471297 A | 12/2013 |
| CN | 203324857 U | 12/2013 |
| CN | 203366082 U | 12/2013 |
| CN | 103512087 A | 1/2014 |
| CN | 103528142 A | 1/2014 |
| CN | 103574771 A | 2/2014 |
| CN | 103574772 A | 2/2014 |
| CN | 103578257 A | 2/2014 |
| CN | 103604272 A | 2/2014 |
| CN | 103616863 A | 3/2014 |
| CN | 103629740 A | 3/2014 |
| CN | 103629866 A | 3/2014 |
| CN | 103671119 A | 3/2014 |
| CN | 203489530 U | 3/2014 |
| CN | 103691835 A | 4/2014 |
| CN | 103745359 A | 4/2014 |
| CN | 203518373 U | 4/2014 |
| CN | 203550232 U | 4/2014 |
| CN | 203550407 U | 4/2014 |
| CN | 203561118 U | 4/2014 |
| CN | 203566105 U | 4/2014 |
| CN | 102705939 B | 5/2014 |
| CN | 103776090 A | 5/2014 |
| CN | 103776212 A | 5/2014 |
| CN | 103791684 A | 5/2014 |
| CN | 103807987 A | 5/2014 |
| CN | 103808012 A | 5/2014 |
| CN | 203586483 U | 5/2014 |
| CN | 203586488 U | 5/2014 |
| CN | 103836761 A | 6/2014 |
| CN | 103854344 A | 6/2014 |

(56) References Cited

FOREIGN PATENT DOCUMENTS

| | | |
|---|---|---|
| CN | 103884152 A | 6/2014 |
| CN | 203633039 U | 6/2014 |
| CN | 203664542 U | 6/2014 |
| CN | 103906529 A | 7/2014 |
| CN | 103925677 A | 7/2014 |
| CN | 103925678 A | 7/2014 |
| CN | 103925682 A | 7/2014 |
| CN | 103925753 A | 7/2014 |
| CN | 103925755 A | 7/2014 |
| CN | 103940053 A | 7/2014 |
| CN | 103940139 A | 7/2014 |
| CN | 103940157 A | 7/2014 |
| CN | 103954082 A | 7/2014 |
| CN | 103954087 A | 7/2014 |
| CN | 203706293 U | 7/2014 |
| CN | 203719239 U | 7/2014 |
| CN | 103968620 A | 8/2014 |
| CN | 103968631 A | 8/2014 |
| CN | 103968636 A | 8/2014 |
| CN | 103968963 A | 8/2014 |
| CN | 104006445 A | 8/2014 |
| CN | 104006597 A | 8/2014 |
| CN | 203796564 U | 8/2014 |
| CN | 104033996 A | 9/2014 |
| CN | 104048406 A | 9/2014 |
| CN | 104048448 A | 9/2014 |
| CN | 104050784 A | 9/2014 |
| CN | 203833232 U | 9/2014 |
| CN | 203837349 U | 9/2014 |
| CN | 203837396 U | 9/2014 |
| CN | 104089378 A | 10/2014 |
| CN | 104101124 A | 10/2014 |
| CN | 104101125 A | 10/2014 |
| CN | 104110740 A | 10/2014 |
| CN | 104121174 A | 10/2014 |
| CN | 104122463 A | 10/2014 |
| CN | 203867902 U | 10/2014 |
| CN | 203908094 U | 10/2014 |
| CN | 203908147 U | 10/2014 |
| CN | 203908786 U | 10/2014 |
| CN | 102958751 B | 11/2014 |
| CN | 104134292 A | 11/2014 |
| CN | 104139226 A | 11/2014 |
| CN | 104142001 A | 11/2014 |
| CN | 104154802 A | 11/2014 |
| CN | 104155964 A | 11/2014 |
| CN | 104165443 A | 11/2014 |
| CN | 104165483 A | 11/2014 |
| CN | 203928142 U | 11/2014 |
| CN | 203964436 U | 11/2014 |
| CN | 203964468 U | 11/2014 |
| CN | 203965900 U | 11/2014 |
| CN | 104180442 A | 12/2014 |
| CN | 104197632 A | 12/2014 |
| CN | 104199358 A | 12/2014 |
| CN | 104214887 A | 12/2014 |
| CN | 104215007 A | 12/2014 |
| CN | 104219289 A | 12/2014 |
| CN | 104236023 A | 12/2014 |
| CN | 104236198 A | 12/2014 |
| CN | 104236244 A | 12/2014 |
| CN | 104251591 A | 12/2014 |
| CN | 204006509 U | 12/2014 |
| CN | 204029050 U | 12/2014 |
| CN | 204044653 U | 12/2014 |
| CN | 204055526 U | 12/2014 |
| CN | 204063308 U | 12/2014 |
| CN | 204063678 U | 12/2014 |
| CN | 104266318 A | 1/2015 |
| CN | 104266423 A | 1/2015 |
| CN | 104279150 A | 1/2015 |
| CN | 104279716 A | 1/2015 |
| CN | 104279836 A | 1/2015 |
| CN | 104289021 A | 1/2015 |
| CN | 104296348 A | 1/2015 |
| CN | 104296489 A | 1/2015 |
| CN | 104315671 A | 1/2015 |
| CN | 204100662 U | 1/2015 |
| CN | 204115391 U | 1/2015 |
| CN | 104329831 A | 2/2015 |
| CN | 104344595 A | 2/2015 |
| CN | 104374044 A | 2/2015 |
| CN | 104374055 A | 2/2015 |
| CN | 104374117 A | 2/2015 |
| CN | 104374159 A | 2/2015 |
| CN | 104374161 A | 2/2015 |
| CN | 104374162 A | 2/2015 |
| CN | 204141931 U | 2/2015 |
| CN | 204143491 U | 2/2015 |
| CN | 204177417 U | 2/2015 |
| CN | 204178470 U | 2/2015 |
| CN | 104406271 A | 3/2015 |
| CN | 104422065 A | 3/2015 |
| CN | 104422198 A | 3/2015 |
| CN | 104422217 A | 3/2015 |
| CN | 104456846 A | 3/2015 |
| CN | 104457048 A | 3/2015 |
| CN | 104457072 A | 3/2015 |
| CN | 104457130 A | 3/2015 |
| CN | 104457132 A | 3/2015 |
| CN | 104467148 A | 3/2015 |
| CN | 204187779 U | 3/2015 |
| CN | 204202120 U | 3/2015 |
| CN | 104482712 A | 4/2015 |
| CN | 104501483 A | 4/2015 |
| CN | 104503309 A | 4/2015 |
| CN | 104515245 A | 4/2015 |
| CN | 104534618 A | 4/2015 |
| CN | 204270404 U | 4/2015 |
| CN | 204291654 U | 4/2015 |
| DE | 202006020319 U1 | 7/2008 |
| DE | 102017214941 A1 | 2/2019 |
| EP | 1226394 B1 | 9/2007 |
| EP | 2056534 A1 | 5/2009 |
| EP | 2769275 A4 | 4/2016 |
| EP | 2903859 B1 | 12/2017 |
| EP | 2462395 B1 | 1/2018 |
| GB | 2399887 A | 9/2004 |
| JP | 2000357146 A | 12/2000 |
| JP | 2001183043 A | 7/2001 |
| JP | 2001208463 A | 8/2001 |
| JP | 2002092120 A | 3/2002 |
| JP | 2002092307 A | 3/2002 |
| JP | 2002162146 A | 6/2002 |
| JP | 2002228154 A | 8/2002 |
| JP | 2002236798 A | 8/2002 |
| JP | 2002295936 A | 10/2002 |
| JP | 2002295939 A | 10/2002 |
| JP | 2002295960 A | 10/2002 |
| JP | 2002295961 A | 10/2002 |
| JP | 2002342564 A | 11/2002 |
| JP | 2003022364 A | 1/2003 |
| JP | 2003090673 A | 3/2003 |
| JP | 2003162243 A | 6/2003 |
| JP | 2003207260 A | 7/2003 |
| JP | 2003242343 A | 8/2003 |
| JP | 2004005027 A | 1/2004 |
| JP | 2004086684 A | 3/2004 |
| JP | 2004259145 A | 9/2004 |
| JP | 2005098560 A | 4/2005 |
| JP | 2005101846 A | 4/2005 |
| JP | 2005164054 A | 6/2005 |
| JP | 2005284611 A | 10/2005 |
| JP | 2005293382 A | 10/2005 |
| JP | 2005311864 A | 11/2005 |
| JP | 2006011930 A | 1/2006 |
| JP | 2006250510 A | 9/2006 |
| JP | 2007046833 A | 2/2007 |
| JP | 2013238345 A | 11/2013 |
| JP | 2014209053 A | 11/2014 |
| KR | 20000030798 A | 6/2000 |
| KR | 20000071913 A | 12/2000 |
| KR | 20010077246 A | 8/2001 |
| KR | 20010077303 A | 8/2001 |

(56) References Cited

FOREIGN PATENT DOCUMENTS

| | | |
|---|---|---|
| KR | 20010094360 A | 11/2001 |
| KR | 20010094428 A | 11/2001 |
| KR | 20010105113 A | 11/2001 |
| KR | 20020004925 A | 1/2002 |
| KR | 20020009140 A | 2/2002 |
| KR | 20020009141 A | 2/2002 |
| KR | 20020013125 A | 2/2002 |
| KR | 20020027722 A | 4/2002 |
| KR | 20020055514 A | 7/2002 |
| KR | 100373092 B1 | 2/2003 |
| KR | 100373093 B1 | 2/2003 |
| KR | 20030016739 A | 3/2003 |
| KR | 100379416 B1 | 4/2003 |
| KR | 100381168 B1 | 4/2003 |
| KR | 20030075692 A | 9/2003 |
| KR | 100400464 B1 | 10/2003 |
| KR | 100403021 B1 | 10/2003 |
| KR | 20040021305 A | 3/2004 |
| KR | 20040029884 A | 4/2004 |
| KR | 20040032649 A | 4/2004 |
| KR | 100429617 B1 | 5/2004 |
| KR | 100432721 B1 | 5/2004 |
| KR | 100437057 B1 | 6/2004 |
| KR | 100457558 B1 | 11/2004 |
| KR | 100457559 B1 | 11/2004 |
| KR | 100471448 B1 | 3/2005 |
| KR | 100476448 B1 | 3/2005 |
| KR | 100484814 B1 | 4/2005 |
| KR | 100487763 B1 | 5/2005 |
| KR | 20050054716 A | 6/2005 |
| KR | 20050058799 A | 6/2005 |
| KR | 20050059883 A | 6/2005 |
| KR | 20050077657 A | 8/2005 |
| KR | 20050078301 A | 8/2005 |
| KR | 20050110147 A | 11/2005 |
| KR | 100535675 B1 | 12/2005 |
| KR | 100565482 B1 | 3/2006 |
| KR | 100593641 B1 | 6/2006 |
| KR | 100600741 B1 | 7/2006 |
| KR | 20060089854 A | 8/2006 |
| KR | 20060117703 A | 11/2006 |
| KR | 20060119580 A | 11/2006 |
| KR | 20060120799 A | 11/2006 |
| KR | 100656394 B1 | 12/2006 |
| KR | 100656400 B1 | 12/2006 |
| KR | 100657926 B1 | 12/2006 |
| KR | 100657927 B1 | 12/2006 |
| KR | 100673435 B1 | 1/2007 |
| KR | 20070012991 A | 1/2007 |
| KR | 100676764 B1 | 2/2007 |
| KR | 20070027180 A | 3/2007 |
| KR | 20070053510 A | 5/2007 |
| KR | 20070074863 A | 7/2007 |
| KR | 100745804 B1 | 8/2007 |
| KR | 20080029408 A | 4/2008 |
| KR | 20080037129 A | 4/2008 |
| KR | 100832492 B1 | 5/2008 |
| KR | 20080060910 A | 7/2008 |
| KR | 20080076381 A | 8/2008 |
| KR | 20090045596 A | 5/2009 |
| KR | 20090047724 A | 5/2009 |
| KR | 100934001 B1 | 12/2009 |
| KR | 100950734 B1 | 3/2010 |
| KR | 100975938 B1 | 8/2010 |
| KR | 100982260 B1 | 9/2010 |
| KR | 101028075 B1 | 4/2011 |
| KR | 101028502 B1 | 4/2011 |
| KR | 101031844 B1 | 5/2011 |
| KR | 20110050764 A | 5/2011 |
| KR | 20110067824 A | 6/2011 |
| KR | 20110124082 A | 11/2011 |
| KR | 20130094047 A | 8/2013 |
| KR | 20140000081 A | 1/2014 |
| KR | 20140026975 A | 3/2014 |
| KR | 20150051514 A | 5/2015 |
| KR | 20150052690 A | 5/2015 |
| TW | 200301047 A | 6/2003 |
| TW | 593950 B | 6/2004 |
| TW | 201309059 A | 2/2013 |
| WO | 2012122390 A2 | 9/2012 |
| WO | 2013189183 A1 | 12/2013 |
| WO | 2014016212 A1 | 1/2014 |
| WO | 2014106060 A1 | 7/2014 |
| WO | 2014183437 A1 | 11/2014 |
| WO | 2015058421 A1 | 4/2015 |
| WO | 2016000041 A1 | 1/2016 |
| WO | 2018082168 A1 | 5/2018 |
| WO | 2019038023 A1 | 2/2019 |

OTHER PUBLICATIONS

"Starting up the Truma iNet System," truma iNet System, pp. 1-8 (2015).
Ferrill, B., et al., "Swipe to Patent: Design Patents In The Age Of User Interfaces," Tech Crunch, retreived from Internet URL: https://techcrunch.com/2015/08/03/swipe-to-patent-design-patents-in-the-age-of-user-interfaces/, on Dec. 12, 2018, pp. 23.
"STIIC—Smart Touch Integrated Intelligence Control," retrieved from Internet URL: https://citimarinestore.com/en/dometic-marine-air-conditioner-parts/4748-stiic-smart-touch-integrated-intelligence-control-263400309.html on Dec. 12, 2018, pp. 3.
International Search Report and Written Opinion for International Application No. PCT/IB2018/058414, dated Jan. 31, 2019.
International Search Report and Written Opinion for International Application No. PCT/EP2018/070390, dated Sep. 21, 2018.
U.S. Appl. No. 62/578,350, filed Oct. 27, 2017 entitled "Systems, Methods, and Apparatuses for Providing Communications Between Climate Control Devices in a Recreational Vehicle".
Office Action for Germany Patent Application No. 102017214941.8 dated Jan. 31, 2020.
Bochner, B., "Digitization in the Mobile Home—Mobile tour into the digital future," URL: https://www.promobil.de/zubehoer/mobil-tour-in-die-digi-zukunft-digitale-kofortzone.
Heinz, D.S., "Bus Technology in the Camper—promobil explains the complex electronics," URL: https://www.promobil.de/werkstatt/elektronik-im-wohnmobil-bus-technik-und-apps.
U.S. Appl. No. 16/641,581 entitled "Recreational Vehicle, Cooling Device, Controlling System and Method for Controlling the Cooling Device" filed Feb. 24, 2020.
DE Application No. 112018005002.5 filed Apr. 24, 2020 entitled "Systems, Methods, and Apparatuses for Providing Communications Between Climate Control Devices in a Recreational Vehicle".

* cited by examiner

SYSTEMS, METHODS, AND APPARATUSES FOR PROVIDING COMMUNICATIONS BETWEEN CLIMATE CONTROL DEVICES IN A RECREATIONAL VEHICLE

CLAIM TO PRIORITY

This non-provisional patent application claims priority to and benefit of, under 35 U.S.C. § 119(e), U.S. Provisional Patent Application Ser. No. 62/578,350, filed Oct. 27, 2017 and titled Systems, Methods, and Apparatuses For Providing Communications Between Climate Control Devices In A Recreational Vehicle, all of which is incorporated by reference herein.

TECHNICAL FIELD

The embodiments described herein generally relate to network communications between controlled devices in a recreational vehicle. Specifically, the embodiments relate to using a gateway device that allows climate control devices to communicate with a central control device of a recreational vehicle.

BACKGROUND

Recreational vehicles typically use climate control devices to manage climate within different areas of the recreational vehicles. Oftentimes, these climate control devices can operate inefficiently because of their inability to communicate with each other. The inability of such climate control devices to communicate can arise from infrastructure issues with the recreational vehicles, including issues such as how communication cables are routed throughout the recreational vehicles. For instance, the areas of some recreational vehicles may not be able to accommodate a climate control device, therefore the climate of certain areas of a recreational vehicle may be unregulated. By allowing such areas to be unregulated, power conservation of the recreational vehicles maybe mismanaged and lead to other inefficiencies during operation of the recreational vehicles.

SUMMARY

The present disclosure is generally directed to methods, apparatus, and computer-readable media (transitory and non-transitory) for providing a gateway device capable of converting network signals, from a control device in a recreational vehicle, to command signals for climate control devices within the recreational vehicle. The recreational vehicle can include existing devices that can communicate with the control device according to a communication protocol (e.g., RV-C protocol). However, the climate control devices may communicate according to a different communication protocol than the existing devices. In order to overcome the inefficiencies involved with using devices that communicate according to separate communication protocols, the gateway device can be provided to make communication within the recreational vehicle more uniform. For instance, a recreational vehicle can include various zones in which one or more devices for managing temperature and/or air control can be operable. The control device within the recreational vehicle can include controls for setting a temperature of each zone (i.e., area or location) within the recreational vehicle, or all zones within the recreational vehicle. However, if a zone includes a climate control device or other air control device that does not communicate according to the communication protocol of the control device, the temperature or air in the zone can be controlled differently than devices in the other zones through which the control device can communicate.

The inability of a control device to communicate with such climate control devices can be overcome by incorporating the gateway device. A network signal provided by the control device can be converted into a command signal that can be understood by the climate control devices in the zone using the gateway device. For instance, the network signal can include data that identifies a temperature set point with which a user would like each zone to be set. The gateway device can process the network signal to identify the temperature set point, and use the temperature set point to generate a command signal for one or more climate control devices within the same zone as the gateway device. The command signal can then be provided to each of the climate control devices in the zone to cause the temperature of the zone to be uniform with the other zones that are also in communication with a control device. This allows each zone to be individually controlled and managed by a single, centralized device.

In some implementations, the gateway device can be in communication with a temperature sensor (e.g., a thermistor) that measures, or is otherwise responsive to, a temperature of the zone in which a gateway device has been assigned or attached. The gateway device can use data from the temperature sensor when generating the command signal that is provided to the climate control devices within the zone. For example, if the gateway device receives a temperature set point from the control device, the temperature set point can be compared to temperature data provided by the temperature sensor in the zone. If the temperature data indicates that the temperature within the zone is higher than the temperature set point, the command signal provided by the gateway device can cause one or more climate control devices in the zone to cool or otherwise lower the temperature of the zone to the temperature set point.

In some implementations, the gateway device can provide feedback to the control device and the control device can present the feedback at a user interface that is connected to the control device. For instance, when the climate control devices have successfully lowered the temperature of the zone associated with the gateway device to the temperature set point indicated by the control device, the gateway device can provide a feedback signal to the control device. The feedback signal can include data that indicates that the temperature of the zone is currently at the temperature identified by the temperature set point. In some implementations, a temperature of each zone in the recreational vehicle can be presented at the user interface of the control device. In this way, the user is able to see a snapshot of how temperature and air control is being managed in each zone of the recreational vehicle. Moreover, because the gateway device can provide a medium through which other devices can be incorporated onto the existing network of the recreational vehicle, the user can incorporate additional air control devices into the vehicle for better managing air control within the vehicle.

In some implementations, a gateway device can include a set of switches that allow the gateway device to be distinguished from other gateway devices on a network. For instance, the gateway device can include a set of dip switches, which can be arranged in multiple different ways, and the arrangement of the switches can influence signals provided to and/or from the gateway device. For instance, a control device within a recreational vehicle can provide a test signal to one or more gateway devices within a recreational vehicle in order to inventory or otherwise identify a number of gateway devices within the recreational vehicle. Each of the gateway devices identified by the control device can be associated with a unique identifier that is at least partially based on the set of switches that are connected to and/or otherwise incorporated into the gateway device. Therefore, when the control device is attempting to change a temperature of a zone associated with a particular gateway device, the control device can address the network signal for the particular gateway device according to the unique identifier.

In some implementations, a recreational vehicle that includes multiple gateway devices will operate with one or more of the gateway devices acting as a repeater or a pass-through for signals received from the control device. For instance, a first gateway device can receive a network signal that includes data identifying a second gateway device. The first gateway device can acknowledge an identifier in the data that identifies the second gateway device and, in response, retransmit the network signal to the second gateway device. In some implementations, the first gateway device can ignore the signal as it passes through to the second gateway device, and the second gateway device can then acknowledge the signal and react accordingly. In some implementations, the first gateway device can retransmit the network signal to the second gateway device with and/or without converting the network signal to a command signal that is understood, or can otherwise be processed, by one or more climate control devices connected to the first gateway device or the second gateway device. In this way, the control device can rely on the gateway device as a repeater and also as a medium through which commands from the control device can be converted into commands that can be understood by other devices within the recreational vehicle. In some implementations, the gateway device identified by the network signal will respond or react to the corresponding data; then, when appropriate, the identified gateway device can send and receive the necessary data between itself and the climate control devices it is connected to.

In some implementations, an apparatus is set forth as including a set of switches. Each switch of the set of switches can correspond to an area designation for one or more climate control devices operable to control a movement of air within an area of a vehicle. The apparatus can further include a climate control device interface configured to transmit a control signal to the one or more climate control devices. Additionally, the apparatus can include a control interface configured to receive a network signal from a control device that is connected to a network that includes one or more other devices located at different areas within the vehicle. Furthermore, the apparatus can include one or more processors connected to the control interface, the climate control device interface, the set of switches, and a temperature sensor. The one or more processors can be configured to perform operations that include: receiving, via the control interface, the network signal, wherein the network signal corresponds to a request to set a temperature of the area of the vehicle, receiving a temperature indication signal from the temperature sensor, converting the network signal to the control signal according a difference in communication protocols associated with the network and the one or more climate control devices, and causing the one or more climate control device to operate based on: (i) the control signal; and (ii) a difference between the temperature of the area indicated by the temperature indication signal and a desired temperature indicated by the temperature control signal. The operations can further include receiving a separate temperature indication signal from the temperature sensor, converting the separate temperature indication signal to a separate network signal based on a communication protocol of the network, and causing the separate network signal to be transmitted to the control device. The one or more climate control devices can include an air conditioner and a ventilation fan, and the climate control device interface can be further configured to provide serial device connections to the air conditioner and the ventilation fan. The control interface can be configured to connect to a separate apparatus that includes another set of switches and another climate control device interface. The one or more processors can be further configured to retransmit a separate control signal, provided by the separate apparatus, to the control device via the control interface. The control signal and the separate control signal can be based at least on arrangements of the set of switches and the other set of switches. The one or more processors can include a global positioning system (GPS) module configured to identify a location of the area of the vehicle in which the one or more climate control devices are affecting air movement.

In other implementations, a method performed by one or more processors is set forth as including operations of receiving, via a network, a network signal from a control device, the network signal corresponding to a request to set a temperature for an area of a vehicle. The operations can further include receiving a temperature indication signal from a temperature sensor that is in communication with the one or more processors, and converting the network signal into a control signal according to a difference in communication protocols associated with the network and one or more climate control devices within the area of the vehicle. The operations can also include causing the one or more climate control devices to operate (i) according to the control signal and (ii) based on a difference between the temperature of the area indicated by the temperature indication signal and a desired temperature indicated by the control signal. In some implementations, the operations can include receiving a separate temperature indication signal from the temperature sensor, converting the separate temperature indication signal into a separate network signal based on a communication protocol of the network, and causing the separate network signal to be transmitted to the control device. The separate network signal can be at least partially based on an arrangement of a set of dip switches that are connected to the one or more processors. The one or more climate control devices can include an air conditioner and a ventilating fan. The operations can further include receiving a separate control signal from a separate apparatus, the separate apparatus comprising another set of switches that are arranged in a different arrangement than a set of switches that are connected to the one or more processors. Additionally, the operations can include causing data provided by the separate control signal to be transmitted to the control device.

In yet other implementations, a system is set forth as including one or more climate control devices configured to control a movement of air within an area of a vehicle, and a gateway device connected to the one or more climate control devices. The gateway device can be configured to generate a control signal for the one or more climate control devices at least partially based on a network signal provided over a network that is available within the vehicle. The system can also include a control device in communications with the gateway device and configured to provide the network signal to the gateway device. The network signal can be provided according to a communication protocol available to the gateway device but separate from a command protocol available to the one or more climate control devices. Additionally, the system can include a temperature sensor in communication with the gateway device. The gateway device can be further configured to compare ambient temperature data from the temperature sensor to setpoint temperature data from the network signal to generate the control signal for adjusting an operation of the one or more climate control devices. The temperature sensor can be connected to the gateway device through a hardwired or wireless connection. The gateway device can include a set of switches that are adjustable to differentiate the gateway device from another gateway device within the vehicle. The gateway device can further include a control interface configured to provide a connection between the control device and the other gateway device. The gateway device can be further configured to transmit data, provided by the control device, to the other gateway device. The one or more climate control devices can include an air conditioner and a ventilating fan. The gateway device can be further configured to provide an indication of a communication error between (i) the gateway device and the control device, or (ii) the gateway device and the one or more climate control devices.

DETAILED DESCRIPTION OF THE INVENTION

Figure 1:
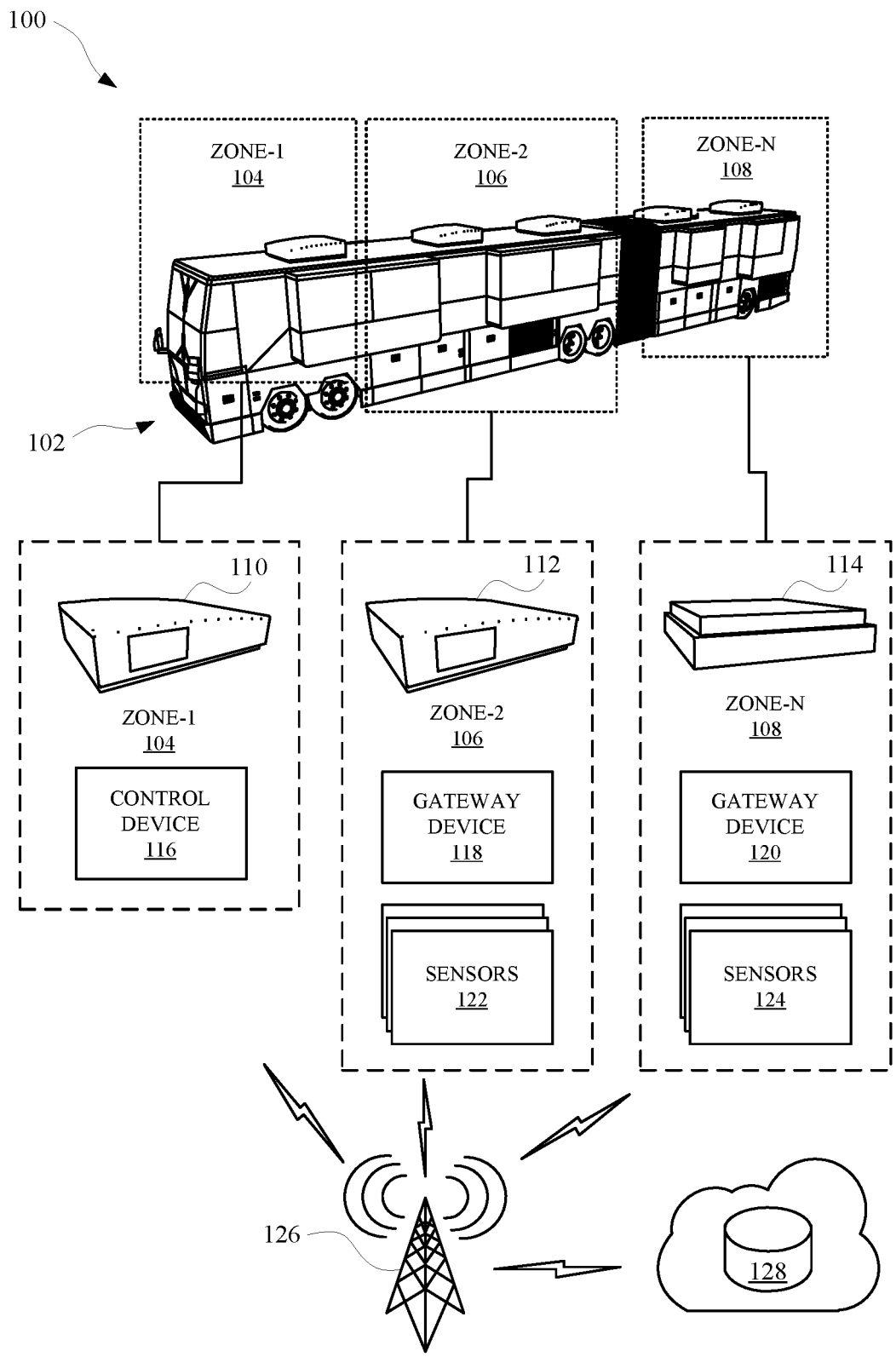
FIG. 1 illustrates a diagram that includes a recreational vehicle with multiple different zones, each zone with a climate that can be controlled by one or more separate devices.

FIG. 1 illustrates a diagram 100 that includes a recreational vehicle 102 with multiple different zones, each zone with a climate that can be controlled by one or more separate devices. The recreational vehicle 102 can be an automobile, aircraft, submerged vehicle, and or any other vehicle that can include a controllable climate. In some implementations, the zones can refer to areas that are not portions of a vehicle, but of another area, such as a portion of a building. Each zone can include one or more devices capable of altering a climate and/or controlling air movement within a respective zone. For instance, zone-1 104 can include an air conditioner 110 that can be attached to a roof of the recreational vehicle 102. Zone-2 106 can also include one or more air conditioners 112 that are also attached to the roof of the recreational vehicle 102. Furthermore, zone-N (where N is any positive integer greater than 2), can include a fan 114 that can be connected to the recreational vehicle 102 at any point of the recreational vehicle 102 to control an amount of air that is moving into and/or out of the recreational vehicle 102. Various devices can be controlled according to the implementations discussed herein, such as, but not limited to awnings, appliances, audio/video devices, slide out, lamps, lights, fans, HVAC systems, doors, water heaters, water supplies, and/or any other devices that can be associated with a recreational vehicle and/or other residential space.

Occasionally, a recreational vehicle 102 can include multiple devices for controlling climate in the different zones of the recreational vehicle 102. However, one or more of the multiple devices may not be able to communicate with a primary control device that has been designated for setting temperature and/or other climate-related variables for the recreational vehicle 102. As a result, a user of the recreational vehicle 102 may not be able to effectively control a climate at each zone of the recreational vehicle 102 through a single control device. In order to overcome this, and other limitations, one or more gateway devices can be incorporated into the recreational vehicle 102.

A control device 116 that operates in the recreational vehicle 102 can be a computing device and/or any other apparatus capable of controlling and/or sending commands to a separate device. The control device 116 can be, for example, a controller that includes a user interface that allows a user to adjust temperature, humidity, noise level, and/or any other environmental aspect of one or more zones of the recreational vehicle 102. For example, the control device 116 can communicate with an air conditioner 110 to increase or decrease a temperature of zone-1 104. The control device 116 can communicate over a network 126, which can refer to a local area network, such as a Wi-Fi network, a Bluetooth connection, an LTE network, a wired network, a public network such as the internet, and/or any other medium through which devices can communicate over a wired or wireless connection. In some implementations, the control device 116 can communicate over a wired RV-C Network and/or a Local Interconnect Network (LIN) Bus protocol to the gateway device. The gateway in turn can relay necessary data from the RV-C network to the air conditioner 110, using a prescribed communication protocol of the air conditioner 110. In some implementations, a gateway device can be integral to the air conditioner, in order that signals being transmitted by the air conditioner, or received at the air conditioner, can be converted by the integral gateway device.

The control device 116 can communicate with various devices, such as, but not limited to awnings, appliances, audio/video devices, slide out, lamps, lights, fans, HVAC systems, doors, water heaters, water supplies, controlled vessels, and/or any other devices that can be associated with a recreational vehicle and/or other residential space. For instance, the control device 116 can communicate with the air conditioner 110 over the network 126 using a communication protocol that is recognized by, or otherwise capable of being processed by, the control device 116, the air conditioner 110, a network device (e.g., a router, modem, and/or any other network device), and/or any other device in the recreational vehicle 102. One or more gateway devices can be connected to the network 126 in order to bridge a connection between the control device 116 and/or other devices within the recreational vehicle 102 that may not be able to communicate using the communication protocol. Additionally, or alternatively, some devices can be retrofitted in order to enable communication with one or more gateways.

For instance, a gateway device 118 and a gateway device 120 can be connected to the network 126 so that the gateway device 118 and the gateway device 120 can communicate with the control device 116. Each gateway device can be operable to convert network signals from the control device into command signals that can be transmitted to one or more devices that are operating in a zone corresponding to a respective gateway device. For example, a network signal received at the gateway device 118, from the control device 116, can be processed and converted into a command signal that can be transmitted from the gateway device 118 to the air conditioner 112. Additionally, a network signal, received at the gateway device 120, from the control device 116, can be converted into a command signal that can be transmitted to the fan 114. In this way, devices that are not typically able to communicate using a particular communication protocol can be connected to an existing network of a recreational vehicle. This can allow a user to more readily and effectively control various zones of a recreational vehicle that include devices (e.g., air conditioners, fans, heaters, etc.) that may not have the functionality to communicate using the communication protocol (e.g., RV-C protocol) available to the control device.

In some implementations, converting a network signal, generated according to a communication protocol, to a command signal that corresponds to a different communication protocol, can include modifying individual data packets sent over the network 126. For instance, a data packet sent from the control device 116 over the network 126 to the gateway device 118 can be modified by the gateway device 118 prior to the air conditioner 112 receiving a command signal that is based on the data packet. Modifying the data packet can include, for example, changing a header of the data packet, categorizing the data packet, filtering the data packet, and/or otherwise identifying content of the data packet that can provide a basis for generating a command signal.

In some implementations, a gateway device can employ one or more cloud services provided by a remote device 128. A service provided by the remote device 128 can include, for example, conversion of the network signals into command signals. For instance, a network signal received by a gateway device 118 can be retransmitted over the network 126 to the remote device 128 for further processing. A service provided by the remote device 128 can convert the network signal from the gateway device 118 to a command signal for the air conditioner 112. The command signal can then be transmitted back to the gateway device 118 over the network 126, and thereafter provided to the air conditioner 112. In this way, computational resources of the gateway device 118 can be preserved. Additionally, energy stored by batteries at the recreational vehicle 102 can be preserved, which can be essential for performance and longevity of the recreational vehicle 102 during long excursions.

In some implementations, the gateway device 118 and/or the gateway device 120 can be connected to one or more sensors. For instance, the gateway device 118 can be connected to sensors 122 and the gateway device 120 can be connected to sensors 124. The sensors can include, for example, a temperature sensor, a humidity sensor, an infrared sensor, a moisture sensor, a light sensor, a camera, a motion sensor, an accelerometer, a gyroscope, and/or any other sensor that can be used for determining properties of climate inside and/or outside the recreational vehicle 102.

In some implementations, gateway device 118 can be used as a repeater for retransmitting signals that are received from the control device 116, but intended for the gateway device 120. In other words, the control device 116 can generate a network signal that is transmitted over the network 126 to the gateway device 118. The gateway device 118 can then retransmit the network signal or convert the network signal to the command signal, and transmit the command signal through the network 126, or a separate communication channel, to the gateway device 120. The gateway device 120 can then transmit the command signal to the fan 114. In some implementations, the control device 116 can transmit the network signal to the gateway device 118, and the gateway device 118 can transmit the network signal to the remote device 128 for processing. The remote device 128 can convert the network signal into a command signal, and transmit the command signal to the gateway device 120, at least based on an identifier included in the network signal that identifies the gateway device 120. In other implementations, the remote device 128 can transmit the command signal back to the gateway device 118, and the gateway device 118 can determine that the network signal and/or the command signal was intended for the gateway device 120. The gateway device 118 can then transmit the command signal to the gateway device 120, at least based on an identifier included in the original network signal provided by the control device 116.

In some implementations, the control device 116 can transmit a temperature set point to the remote device 128. Additionally, each gateway device can transmit a current temperature of their respective zone to the remote device 128. The remote device 128 can compare the temperature set point to the current temperatures of the zones to generate individual command signals that can be provided over the network 126 to each of the gateway devices (118 and 120). In this way, computational resources and energy can be preserved at the recreational vehicle 102 by leveraging the processing capabilities of the remote device 128.

Figure 2:
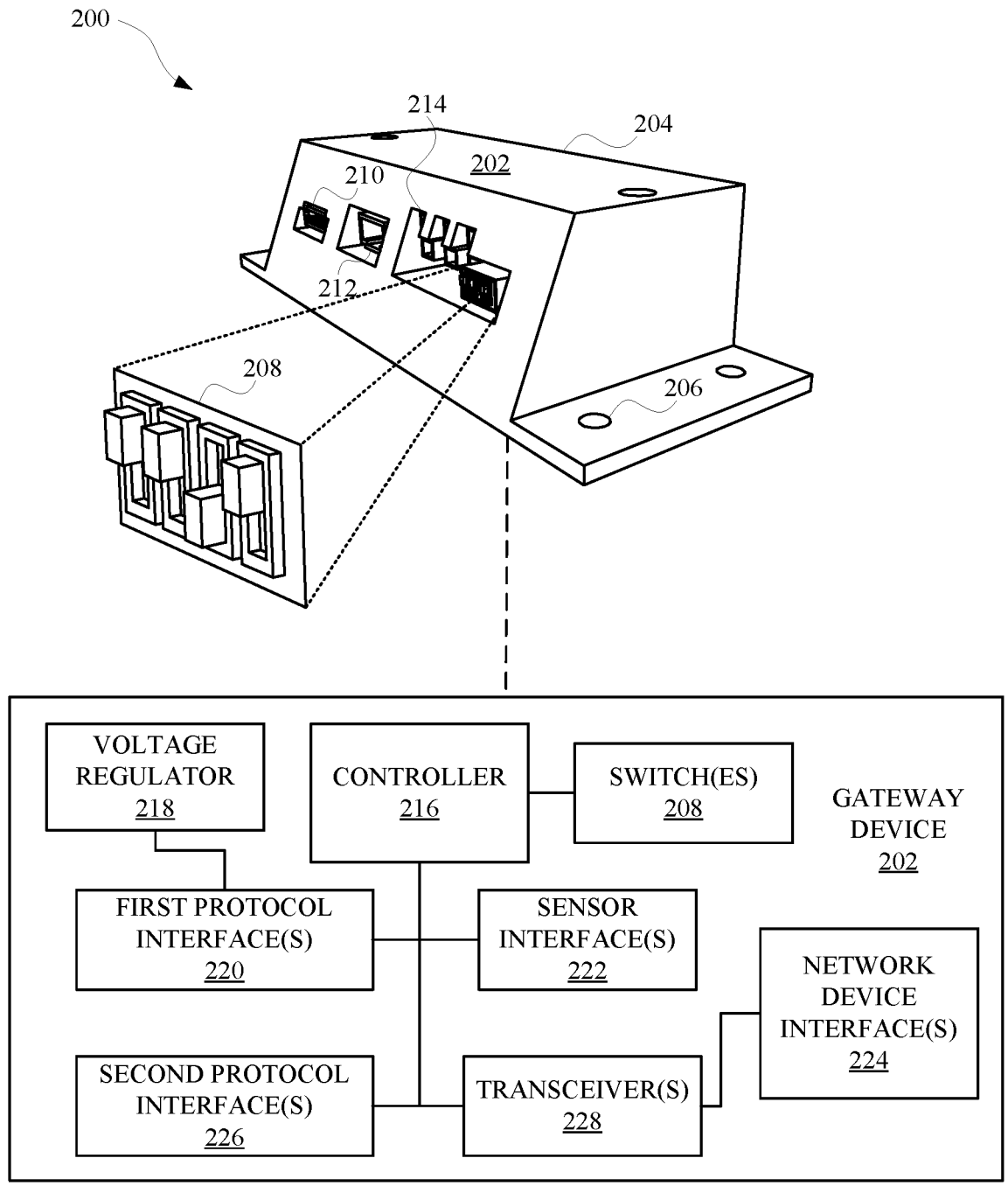
FIG. 2 illustrates a diagram of a gateway device that can include multiple different connections for interfacing with devices capable of controlling climate within a recreational vehicle (RV).

FIG. 2 illustrates a diagram 200 of a gateway device 202 that can include multiple different connections for interfacing with devices capable of controlling climate within a recreational vehicle (RV). Specifically, the gateway device 202 can include a housing 204 that can at least partially envelope components of the gateway device 202 and include apertures for receiving connections to other devices within the recreational vehicle. For example, the gateway device 202 can include a first opening 210 for receiving a connection from a climate control device at a first protocol interface 220 of the gateway device 202. The first protocol interface 220 can connect to, for example, an air conditioner that communicates according to a first communication protocol. A voltage regulator 218 of the gateway device 202 can regulate a voltage of a signal being received by the gateway device 202, and/or being sent to the air conditioner. In this way, the gateway device 202 can be protected from overvoltage conditions that may occur at the air conditioner or other climate control devices. The first protocol interface 220 can receive commands signals from a controller 216 for controlling the air conditioner and/or other air handling devices that can be connected to the first protocol interface 220.

The gateway device 202 can also include a second protocol interface 226 for communicating with a different climate control device than the climate control device that is connected to the first protocol interface 220. For example, the second protocol interface 226 can be connected to a fan, such as a ventilating fan, that can be connected to a roof or other surface of a recreational vehicle, and communicate according to a second communication protocol. The gateway device 202 can use separate protocols for communicating over the first protocol interface 220 and the second protocol interface 226. For instance, in some implementations, the first protocol interface 220 can include a different number of pins than a second protocol interface 226 of the gateway device 202. The gateway device 202 can include a controller 216 that can include one or more processors and/or one or more memory devices capable of receiving network signals, directly or indirectly, from a control device, and converting the network signals to commands signals that can be transmitted, by the gateway device 202 according to different communication protocols.

In some implementations, the gateway device 202 can include one or more switches 208. The set of switches 208 can be arranged in multiple different configurations, which can make the gateway device 202 uniquely identifiable by the control device. Specifically, the gateway device 202 can be designated to a particular zone of a recreational vehicle, at least based on the arrangement of the switches 208. Because each zone of the recreational vehicle can be different, each gateway device 202 that is designated to a zone can include a set of switches 208 that are arranged in a unique configuration compared to the other gateway devices 202 within the recreational vehicle. In this way, the set of switches 208 can influence command signals and/or network signals that are transmitted to and from the gateway device 202. The controller 216 can be connected to the switches 208 and determine an arrangement of the switches 208. The controller 216 can then generate commands signals for climate control devices that are connected to the gateway device 202 based on the arrangement of the switches 208. If a gateway device 202 and/or a control device determines that two or more gateway devices 202 have switches that are arranged in the same pattern, the gateway device 202 and/or the control device can provide an indication to a user. Specifically, a user interface that is connected to the control device can be caused to present a visible and/or audible indication that identifies the two or more gateway devices 202 that include the same arrangement of switches 208. Such indications can be provided according to a diagnostics process that is initialized by the control device and/or the gateway device 202 in order to mitigate network errors from occurring within the recreational vehicle.

In some implementations, the gateway device 202 can include a third opening 214 for connecting with multiple different devices. For example, the third opening 214 can include one or more sensor interfaces 222 for connecting with one or more sensors located within and/or outside the recreational vehicle. The sensor interface 222 can be connected to, for example, a temperature sensor that is arranged to measure a temperature of a zone to which the gateway device 202 has been designated. Signals from different sensors received at the sensor interface 222 can be received by the controller 216 and processed in order that commands signals can be generated based on data that is derived from the signals. For example, the controller 216 can transmit a temperature set point to the gateway device 202. The controller 216 can compare data from a temperature sensor to determine how to modify operations of climate control devices within the zone of the gateway device 202. In this way, the network signal from the control device can be converted to a command signal at least partially based on (i) data from a sensor that measures a condition of the zone, and (ii) a communication protocol through which a climate control device can receive commands.

The control device can communicate with the gateway device 202 via one or more transceivers 228. The transceivers 228 can include one or more wireless communication modules capable of communicating with devices inside and/or outside the recreational vehicle using one or more different communication protocols. For example, the control device can communicate with existing network devices connected to the recreational vehicle. In some implementations, the gateway device 202 can communicate with the existing network devices using a network device interface 224 that can be connected to the transceivers 228 and/or connected to the controller 216. The existing network devices can also be climate control devices, but can communicate with the control device using a communication protocol that is common to, or otherwise capable of being processed by, the control device. Therefore, the gateway device 202 can relay signals from the control device to existing network devices without modifying a communication protocol of the network signal from the control device to the existing network device. In this way, the gateway device 202 is capable of discerning devices that need their commands signals to be based on a different communication protocol and/or to be based on the original communication protocol of the control device.

In some implementations, at least one of the transceivers 228 is capable of communicating with a remote device, such as a server device, that provides a cloud service to local computing devices. For instance, the gateway device 202 can transmit data received from a control device to the remote device for processing. The remote device can then return processed data back to the gateway device 202, and the gateway device 202 can use the process data to generate commands signals for climate control devices that are connected to the gateway device 202.

In some implementations, the transceivers 228 can include a global positioning system (GPS) transceiver 228. The GPS transceiver can provide geolocation data to the control device in order that the control device can identify a zone at which the gateway device 202 has been setup. Furthermore, sensor data from sensors connected to the gateway device 202 can be tagged with geolocation data provided by a GPS transceiver. The controller 216 and/or the control device can use the tagged sensor data to make determinations and/or schedules regarding how to control the climate of the recreational vehicle in which the gateway device 202 and/or the control device are operable. In some implementations, a user interface of the control device can present a mapping of the various zones of the recreational vehicle, and visually map the sensor data to the various zones to allow the user to more readily gage the climate of the recreational vehicle.

Figure 3:
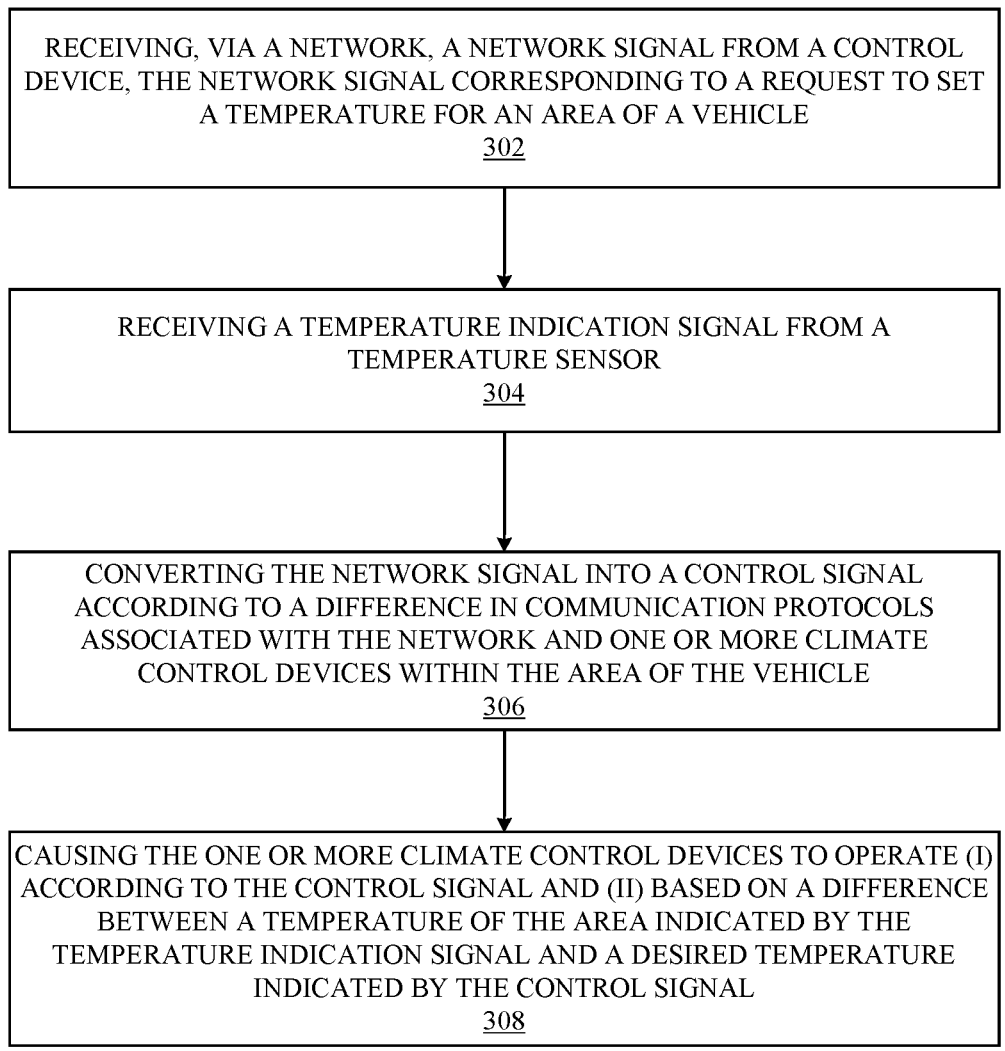
FIG. 3 illustrates a method for converting commands transmitted over a network in a vehicle in order that peripheral devices within the vehicle can be more effectively controlled.

FIG. 3 illustrates a method 300 for converting commands transmitted over a network in a vehicle in order that peripheral devices within the vehicle can be more effectively controlled. The method 300 can be performed by one or more computing devices and/or any other apparatus capable of providing an interface between a network and a controllable device. The method 300 can include a block 302 of receiving, via a network, a network signal from a control device. The network signal can correspond to a request to set a temperature for an area of a vehicle. For instance, the vehicle can be a recreational vehicle that includes the network for enabling devices within the recreational vehicle to communicate. For instance, air movement within the recreational vehicle can be coordinated over the network using network signals that are communicated between controlled devices. In order to keep the recreational vehicle at the set temperature, the controlled devices can control air movement in and/or out of the recreational vehicle based on the network signals. However, some recreational vehicles can include additional climate control devices that may not be able to directly communicate over the network. In order to allow the additional climate control devices to communicate over the network, the recreational vehicle can include a gateway device that is capable of converting the network signals from a control device to control signals for the additional climate control devices.

At block 304, of method 300, the temperature indication signal can be received from a temperature sensor. The temperature indication signal can be received by the gateway device that is connected to the control device over the network. The temperature sensor can be connected to the gateway device wirelessly through one or more communication mediums, such as Bluetooth, Wi-Fi, LTE, and/or any other communication protocol capable of allowing a peripheral device (e.g., a sensor) to communicate with a gateway device. Alternatively, the temperature sensor can be connected to the gateway device through a wired connection that allows the gateway device to receive the temperature indication signal from the temperature sensor and allow the temperature sensor to be powered by the gateway device.

The temperature sensor and/or the gateway device can be located within the recreational vehicle in an area and/or zone in which one or more climate control devices are designated. For example, a climate control device can be designated to manage air movement within a zone of a vehicle, while other devices within the recreational vehicle can manage air movement within other zones of the recreational vehicle. A gateway device can be designated for a particular zone using one or more switches of a set of switches that are part of the gateway device. When the recreational vehicle includes multiple gateway devices, each set of switches on each gateway device can each have a different arrangement for each set of switches. In some implementations, the set of switches can be a set of dip switches, which can influence or otherwise modify control signals that are sent and/or received from a respective gateway device.

The method 300 can further include a block 306 for converting the network signal into a control signal according to a difference between communication protocols associated with the network and one or more climate control devices within the area or zone of the vehicle. A communication protocol of the network can be, for example, an RV-C protocol, a National Marine Electronics Protocol (NMEA) protocol (e.g., NMEA 2000), and/or a Local Interconnect Network (LIN) Bus protocol. In some implementations, a communication protocol of the network can be any communication protocol that allows appliances within a vehicle to communicate with, and/or otherwise be controlled by, a control device. The control device can be, for example, a computing device that includes a user interface, such as a control panel, that allows a user to provide input for controlling operations of one or more devices within the vehicle. The climate control devices can operate according to a communication protocol that is different than a communication protocol of the control device and/or a communication protocol of the network. The gateway device can receive the network signal and convert the network signal to the control signal using one or more algorithms and/or processes for converting signals received over a network. In some implementations, converting the network signal into the control signal can include, for example, transmitting data included in the network signal to a remote device (e.g., a device that is external to the vehicle, such as a cloud server) that is configured to convert the data into a format that can be processed by the climate control devices and/or at the gateway device. Additionally, or alternatively, converting a network signal to a control signal can include, for example, converting the network signal into an analog signal, which a control device can be responsive to. For example, the gateway device can receive the network signal and convert the network signal into an analog signal from controlling one or more HVAC devices and/or any other device disposed within the vehicle.

The method 300 can also include a block 308 of causing the one or more climate control devices to operate (i) according to the control signal and (ii) based on a difference between a temperature of the area indicated by the temperature indication signal and a desired temperature indicated by the control signal. The gateway device can transmit the control signal to the one or more climate control devices through a wired connection and/or a wireless connection according to a communication protocol that is different than the communication protocol of the network. In some implementations, the control signal can be modified or otherwise be based on a determined difference between the temperature of the area indicated by the temperature indication signal and the desired temperature indicated by the control signal. When the difference indicates that the climate control devices should operate to cool the area or zone of the vehicle, the control signal can cause the climate control devices to increase an amount of cool air being provided to the zone of the vehicle. Alternatively, if the difference indicates that the desired temperature should be warmer than a current temperature of the area, the control signal can cause the climate control devices to operate in a way that increases the temperature of the zone of the vehicle.

Figure 4:
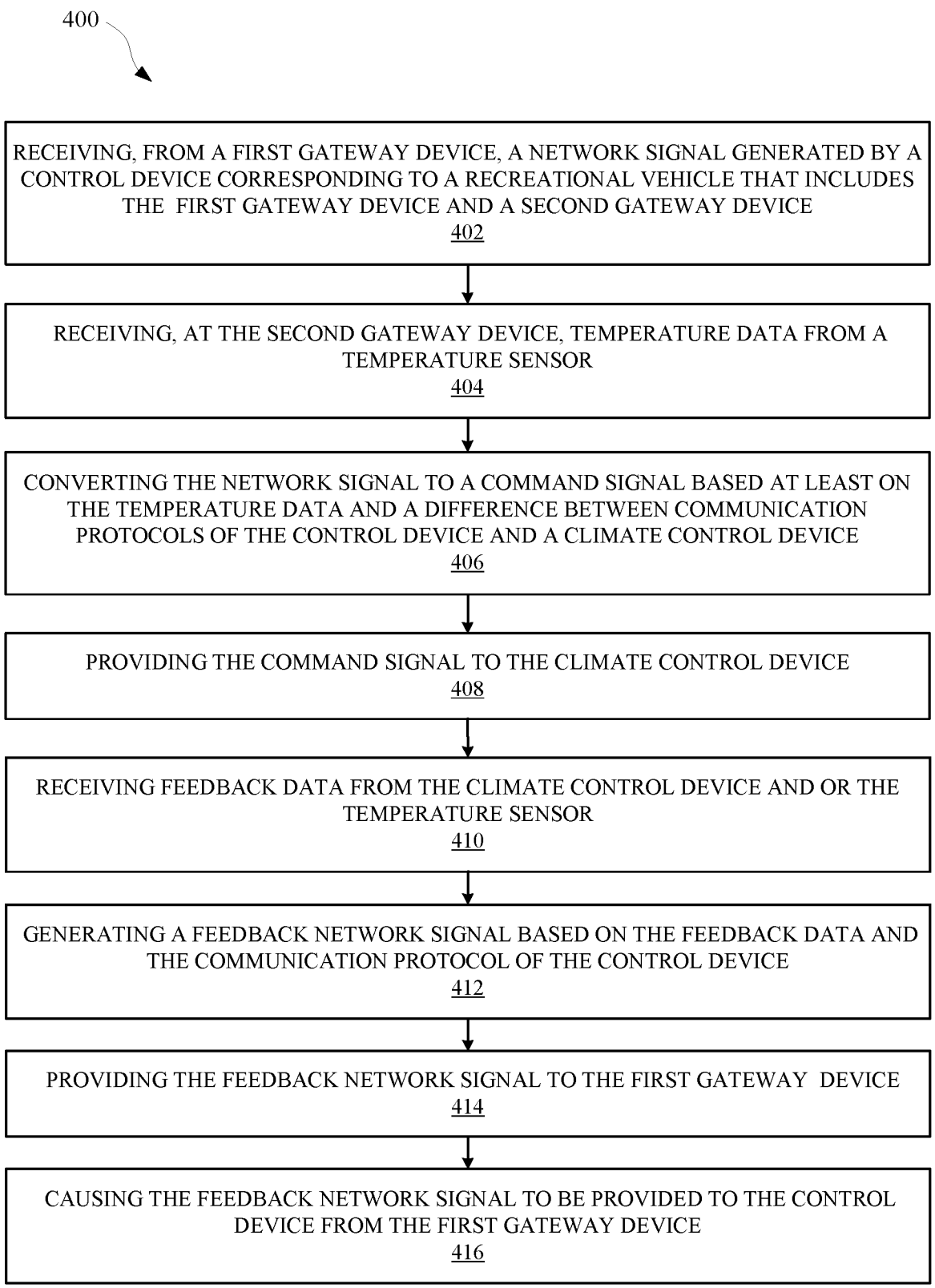
FIG. 4 illustrates a method for providing feedback to a control device using multiple gateway devices in a recreational vehicle.

FIG. 4 illustrates a method 400 for providing feedback to a control device using multiple gateway devices in a recreational vehicle. The method 400 can be performed by one or more computing devices and/or any other apparatus capable of communicating with a control device. The method 400 can include a block 402 of receiving, from a first gateway device, a network signal generated by a control device operating in association with a recreational vehicle that includes the first gateway device and a second gateway device. The control device can be attached to an interior of the recreational vehicle and communicate over one or more different communication mediums such as, for example, Wi-Fi, Bluetooth, LTE, and/or any other network communication medium. The control device can communicate with the first gateway device and the second gateway device through one or more of the communication mediums and/or through a wired connection to the first gateway device and/or the second gateway device. In some implementations, the control device can communicate with various climate control devices within the recreational vehicle through a particular communication protocol (e.g., RV-C protocol). Furthermore, the control device can communicate with the first gateway device and the second gateway device using the particular communication protocol. However, the first gateway device and the second gateway device can translate or otherwise convert signals from the control device for providing commands signals to other climate control devices that are in communication with the first gateway device and/or the second gateway device.

The method 400 can further include a block 404 of receiving, at the second gateway device, temperature data from a temperature sensor. The temperature sensor can be arranged to be responsive to temperature changes in a zone of the recreational vehicle. The second gateway device can be designated for controlling devices within the zone by way of the control device and/or a set of switches that are attached to the second gateway device. For example, the second gateway device can include a set of dip switches that can influence whether signals from the control device will be processed by the second gateway device, retransmitted by the second gateway device, bypassed at the second gateway device, and/or otherwise associated with the second gateway device. The temperature sensor can be directly attached to the second gateway device through a hardwired connection, and/or through a wireless connection over a communication medium such as Bluetooth, Zigbee, Wi-Fi, LTE, and/or any other wireless communication medium or protocol.

The method 400 can further include a block 406 of converting the network signal to a command signal based at least on the temperature data and/or a difference between communication protocols of the control device and a climate control device. For instance, the climate control device can be an air conditioner that is in communication with the second gateway device, but cannot otherwise communicate with the control device. Therefore, the network signal from the control device can be converted to the command signal by the second gateway device, and/or the first gateway device, in order that the control device can influence the zone at which the air conditioner is operable.

The method 400 can also include a block 408 of providing the command signal to the climate control device. The command signal can be provided over a wired connection to the air conditioner, or a wireless connection to the air conditioner. The commands signal can correspond to a request for the second gateway device to change a temperature of the zone to which the second gateway device has been designated. For instance, the control device can request that the zone of the second gateway device be decreased in temperature. In response, the second gateway device can provide a command signal that causes the air conditioner to increase a cool air output of the air conditioner. Alternatively, the control device can provide the first gateway device with a temperature set point that is embodied in the network signal. The network signal can be relayed to a second gateway device, which can identify the temperature set point from the network signal and generate a command signal for the air conditioner. The command signal can cause the air conditioner to operate in a way that makes a temperature of the zone reach the temperature set point provided by the control device.

At block 410 of the method 400, feedback data is received, at the second gateway device, from the climate control device and/or the temperature sensor. The feedback data can provide an indication or a status of how the temperature is changing in the zone relative to a temperature measured when the network signal was originally received at the second gateway device or originally transmitted from the control device. Alternatively, the feedback data can identify a difference between the temperature set point identified in the network signal and a current temperature measured by the temperature sensor in the zone of the recreational vehicle.

The method 400 can include a block 412 of generating a feedback network signal based on the feedback data and the communication protocol of the control device. In other words, the second gateway device can use the feedback data from the climate control device and/or the temperature sensor to generate the feedback network signal, which is generated according to the communication protocol. Converting the feedback data into the feedback network signal can include generating a header for the feedback network signal, encrypting the network signal according to a particular protocol, and/or otherwise incorporating the feedback data into a format that is capable of being processed by the control device.

The method 400 at block 414 can include providing the feedback network signal to the first gateway device. The second gateway device can provide the feedback network signal to the first gateway device in order to leverage the first gateway device as a network bridge to the control device. In other words, the second gateway device may not be within a distance or radius in which the control device is capable of communicating quality signals. Therefore, the first gateway device can retransmit signals from the second gateway device to the control device. Alternatively, the second gateway device can provide feedback directly to the control device. Furthermore, the feedback network signal can include a signature or identifier that identifies the origin of the feedback network signal as the second gateway device. In this way, any subsequent adjustments, to climate in the zone corresponding to the second gateway device, can be made more accurate, or be made based on real-time data received from devices that are connected to the second gateway device.

The method 400 can optionally include a block 416 of causing the feedback network signal to be provided to the control device from the first gateway device. The first gateway device can process the feedback network signal to determine that the feedback network signal was intended by the second gateway device to be received by the control device. In some implementations, the first gateway device converts feedback data from the second gateway device into the feedback network signal based on the communication protocol of the control device. Alternatively, the second gateway device can communicate with a remote device, such as a cloud server, that can convert the feedback data into a feedback network signal that can be understood, or otherwise processed by, the control device. The remote device can communicate directly with the control device, or the remote device can communicate the converted feedback data to the second gateway device. By setting up a network of devices in a recreational vehicle in this way, computational resources can be preserved, and energy stored at the recreational vehicle can be conserved.

Figure 5:
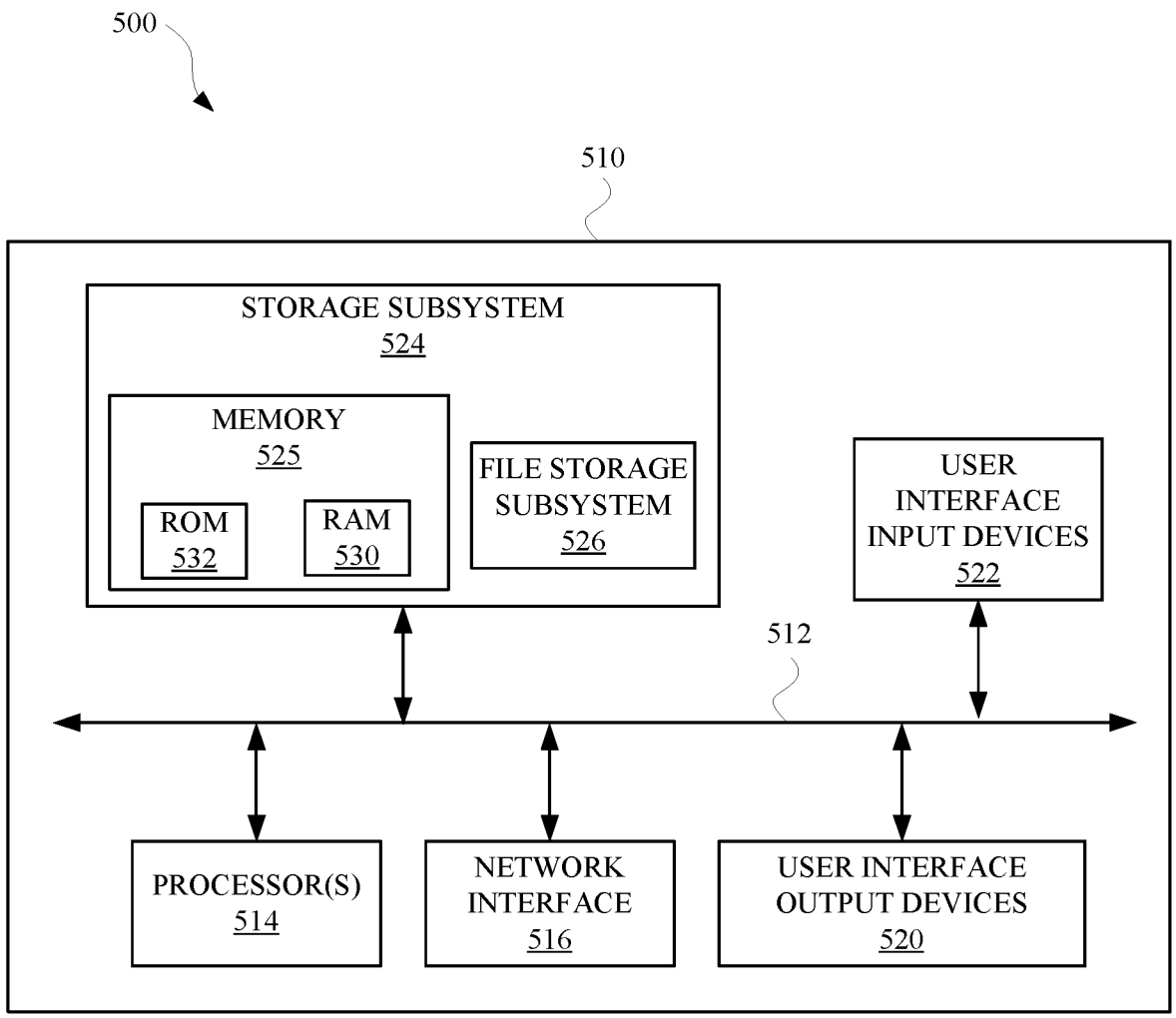
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300, method 400, and/or to implement one or more of the control device, the gateway device, the remote device, the controller, and/or any other device or apparatus discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. An apparatus, comprising:
a set of switches, each switch of the set of switches corresponding to an area designation for one or more climate control devices operable to control a movement of air within an area of a vehicle;
a climate control device interface configured to transmit a control signal to the one or more climate control devices;
a control interface configured to:
receive a network signal from a control device that is connected to a network that includes one or more other devices located at different areas within the vehicle, and
connect to a separate apparatus that includes another set of switches and another climate control device interface; and
one or more processors connected to the control interface, the climate control device interface, the set of switches, and a temperature sensor, the one or more processors configured to perform operations that include:
receiving, via the control interface, the network signal, wherein the network signal corresponds to a request to set a temperature of the area of the vehicle,
receiving a temperature indication signal from the temperature sensor,
converting the network signal to the control signal according a difference in communication protocols associated with the network and the one or more climate control devices,
causing the one or more climate control device to operate based on:
(i) the control signal; and
(ii) another difference between the temperature of the area indicated by the temperature indication signal and a desired temperature indicated by the control signal,
receiving, subsequent to causing the one or more climate control devices to operate according to the control signal, another temperature indication signal from the temperature sensor, and
communicating the other temperature indication signal to the separate apparatus that includes the other set of switches and the other climate control device interface.

2. The apparatus of claim 1, wherein the operations further include:
converting the other temperature indication signal to a separate network signal based on a communication protocol of the network, and
causing the separate network signal to be transmitted to the control device.

3. The apparatus of claim 1,
wherein the one or more climate control devices include an air conditioner and a ventilation fan, and
wherein the climate control device interface is further configured to provide serial device connections to the air conditioner and the ventilation fan.

4. The apparatus of claim 1, wherein the other set of switches is arranged differently than the set of switches.

5. The apparatus of claim 1, wherein the one or more processors are further configured to retransmit a separate control signal, provided by the separate apparatus, to the control device via the control interface.

6. The apparatus of claim 4, wherein the control signal and the separate control signal are based at least on arrangements of the set of switches and the other set of switches.

7. The apparatus of claim 1, wherein the one or more processors are configured to identify a location of the area of the vehicle in which the one or more climate control devices are affecting air movement.

8. A method performed by one or more processors, the method comprising:
   receiving, at a vehicle gateway device via a network, a network signal from a control device, the network signal corresponding to a request to set a temperature for an area of a vehicle,
      wherein the vehicle gateway device is in communication with another vehicle gateway device in the vehicle;
   receiving a temperature indication signal from a temperature sensor that is in communication with the vehicle gateway device;
   converting the network signal into a control signal according to a difference in communication protocols associated with the network and one or more climate control devices within the area of the vehicle;
   causing the one or more climate control devices to operate (i) according to the control signal and (ii) based on another difference between the temperature of the area indicated by the temperature indication signal and a desired temperature indicated by the control signals;
   receiving, subsequent to causing the one or more climate control devices to operate according to the control signal, another temperature indication signal from the temperature sensor; and
   communicating the other temperature indication signal to the other vehicle gateway device.

9. The method of claim 8, further comprising:
   converting the other separate temperature indication signal into a separate network signal based on a communication protocol of the network; and
   causing the separate network signal to be transmitted to the control device.

10. The method of claim 9, wherein the separate network signal is at least partially based on an arrangement of a set of dip switches that are integral to the vehicle gateway device.

11. The method of claim 8, wherein the one or more climate control devices include an air conditioner and a ventilating fan.

12. The method of claim 10, wherein the set of dip switches are arranged in a different arrangement than a separate set of switches that are integral to the other vehicle gateway device.

13. The method of claim 12, wherein each of the control device, the vehicle gateway device, and the other vehicle gateway device are each located in different zones of the vehicle.

14. A system, comprising:
   one or more climate control devices configured to control a movement of air within an area of a vehicle;
   a gateway device and another gateway device connected to the one or more climate control devices,
      wherein the gateway device is configured to generate a control signal for the one or more climate control devices at least partially based on a network signal provided over a network that is available within the vehicle;
   a control device in communications with the gateway device and configured to provide the network signal to the gateway device,
      wherein the network signal is provided according to a communication protocol available to the gateway device but separate from a command protocol available to the one or more climate control devices; and
   a temperature sensor in communication with the gateway device,
      wherein the gateway device is further configured to:
         compare ambient temperature data from the temperature sensor to set-point temperature data from the network signal to generate the control signal for adjusting an operation of the one or more climate control devices,
         receive, subsequent to adjusting the operation of the one or more climate control devices, another temperature indication signal from the temperature sensor, and
         communicate the other temperature indication signal to another gateway device located within the vehicle.

15. The system of claim 14, wherein the temperature sensor is connected to the gateway device through a hard-wired or wireless connection.

16. The system of claim 14, wherein the gateway device includes a set of switches that are adjustable to differentiate the gateway device from the other gateway device located within the vehicle.

17. The system of claim 16, wherein the gateway device further includes a control interface configured to provide a connection between the control device and the other gateway device.

18. The system of claim 16, wherein the gateway device is further configured to transmit data, provided by the control device, to the other gateway device.

19. The system of claim 14, wherein the one or more climate control devices include an air conditioner and a ventilating fan.

20. The system of claim 14, wherein the gateway device is further configured to provide, to the control device, an indication of a communication error between the gateway device and the other gateway device located within the vehicle.

* * * * *